US011429188B1

(12) United States Patent
Danheim et al.

(10) Patent No.: US 11,429,188 B1
(45) Date of Patent: Aug. 30, 2022

(54) MEASURING SELF AWARENESS UTILIZING A MOBILE COMPUTING DEVICE

(71) Applicant: Sensie, LLC, Miami, FL (US)

(72) Inventors: Mike Danheim, Miami, FL (US); Thomas Gersten, Miami, FL (US); Klim Radostev, Miami, FL (US)

(73) Assignee: Sensie, LLC, Miami, FL (US)

( * ) Notice: Subject to any disclaimer, the term of this patent is extended or adjusted under 35 U.S.C. 154(b) by 0 days.

(21) Appl. No.: 17/352,532

(22) Filed: Jun. 21, 2021

(51) Int. Cl.
*G06F 3/01* (2006.01)
*G06K 9/00* (2022.01)
*G06V 40/20* (2022.01)

(52) U.S. Cl.
CPC .............. *G06F 3/014* (2013.01); *G06F 3/017* (2013.01); *G06K 9/0051* (2013.01); *G06K 9/00523* (2013.01); *G06V 40/28* (2022.01)

(58) Field of Classification Search
CPC ....... G06F 3/014; G06F 3/017; G06K 9/0051; G06K 9/00523; G06V 40/28
See application file for complete search history.

(56) References Cited

U.S. PATENT DOCUMENTS

| | | | | |
|---|---|---|---|---|
| 8,781,991 B2* | 7/2014 | Lee | ...................... | A61B 5/165 |
| | | | | 706/52 |
| 9,104,271 B1* | 8/2015 | Adams | ..................... | G06F 3/014 |
| 9,762,719 B2 | 9/2017 | Tartz et al. | | |
| 9,824,602 B2 | 11/2017 | Merzenich et al. | | |
| 9,928,462 B2* | 3/2018 | Lee | ......................... | A61B 5/165 |
| 10,198,505 B2* | 2/2019 | Frank | .................... | G06Q 10/101 |
| 10,579,866 B2* | 3/2020 | Bedrosian | .............. | A61B 5/021 |
| 10,758,159 B2* | 9/2020 | Dannheim | ........... | A61B 5/4029 |
| 10,835,802 B1 | 11/2020 | Mayer et al. | | |
| 10,923,226 B2* | 2/2021 | Macary | .................. | G16H 20/30 |
| 11,017,688 B1* | 5/2021 | Arazi | ..................... | G16H 20/60 |
| 11,071,483 B2* | 7/2021 | Egi | ........................ | A61B 5/165 |
| 11,228,810 B1* | 1/2022 | Arazi | ................. | H04N 21/4668 |
| 11,232,466 B2* | 1/2022 | Frank | .................. | G06F 21/6245 |
| 11,269,891 B2* | 3/2022 | Frank | ................ | G06F 16/24573 |
| 11,294,485 B2* | 4/2022 | Dalton | ..................... | G06F 3/014 |
| 11,304,601 B2* | 4/2022 | Samadani | .............. | A61B 5/031 |
| 2007/0135689 A1 | 6/2007 | Asukai et al. | | |
| 2008/0129694 A1* | 6/2008 | Haven | ..................... | G06F 3/014 |
| | | | | 345/158 |
| 2008/0291160 A1 | 11/2008 | Rabin | | |

(Continued)

*Primary Examiner* — Grant Sitta
(74) *Attorney, Agent, or Firm* — Mark Terry (57) ABSTRACT

A mobile computing device for measuring self-awareness of a user includes motion sensors and a processor for displaying instructions on how to conduct a whipping gesture, executing a body awareness assessment including receiving sensor data while the user performs multiple whipping gestures, executing an emotional awareness assessment including receiving sensor data while the user performs multiple whipping gestures, executing a self-assessment including receiving sensor data while the user performs multiple whipping gestures, executing a resiliency awareness assessment including receiving a response from the user to a question and generating a final self-awareness score corresponding to the user's self-awareness based on the body awareness assessment, emotional awareness assessment, self-assessment and resiliency awareness assessment.

20 Claims, 6 Drawing Sheets

(56) References Cited

U.S. PATENT DOCUMENTS

| | | | |
|---|---|---|---|
| 2010/0055658 A1 | 3/2010 | Sturm et al. | |
| 2011/0022332 A1* | 1/2011 | Kailas | A61B 5/165 |
| | | | 702/42 |
| 2011/0183305 A1 | 7/2011 | Orbach | |
| 2013/0253329 A1* | 9/2013 | Sato | A61B 5/165 |
| | | | 600/473 |
| 2014/0114680 A1* | 4/2014 | Mills | G16H 50/30 |
| | | | 705/2 |
| 2014/0200432 A1* | 7/2014 | Banerji | G16H 20/30 |
| | | | 607/54 |
| 2015/0164377 A1* | 6/2015 | Nathan | A61B 5/6802 |
| | | | 600/595 |
| 2015/0338917 A1* | 11/2015 | Steiner | H04L 9/3271 |
| | | | 345/156 |
| 2016/0267809 A1 | 9/2016 | deCharms | |
| 2017/0142967 A1* | 5/2017 | Reed | A01N 25/16 |
| 2017/0231560 A1* | 8/2017 | Hyde | A61B 5/0002 |
| | | | 340/870.07 |
| 2017/0232300 A1* | 8/2017 | Tran | A63B 71/06 |
| | | | 434/247 |
| 2017/0270951 A1* | 9/2017 | Ekambaram | G06K 9/00 |
| 2017/0300930 A1 | 10/2017 | Forbes | |
| 2018/0052913 A1* | 2/2018 | Gaskill | G06N 5/02 |
| 2018/0168847 A1* | 6/2018 | Vacca | A61F 13/00 |
| 2018/0189451 A1* | 7/2018 | Dannheim | A61B 5/7264 |
| 2019/0258850 A1 | 8/2019 | Rihn et al. | |
| 2019/0265802 A1* | 8/2019 | Parshionikar | G06F 3/012 |
| 2019/0332247 A1* | 10/2019 | Liu | G06F 3/04817 |
| 2020/0401794 A1* | 12/2020 | Ishii | G10L 15/22 |
| 2021/0097267 A1* | 4/2021 | Stokman | G06V 40/28 |

\* cited by examiner

MEASURING SELF AWARENESS UTILIZING A MOBILE COMPUTING DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the measurement and detection of the human body's somatic responses to stimuli.

BACKGROUND

Measuring the self-awareness of an individual is the subject of significant research and development. Often, a conscious, introspective individual can have difficulty identifying his or her self-awareness. One way to accomplish this task is to evaluate the individual's voluntary nervous system, also known as the somatic nervous system, which is the part of the peripheral nervous system associated with skeletal muscle voluntary control of body movements. The somatic nervous system controls all voluntary muscular systems within the body, as well as reflex arcs.

A wide array of methods are used to evaluate the somatic nervous system. Galvanic skin response sensors, for example, measure electrodermal activity, which is the property of the human body that causes continuous variation in the electrical characteristics of the skin. Skin resistance varies with the state of sweat glands in the skin. Sweating is controlled by the sympathetic nervous system, and skin conductance is an indication of psychological or physiological arousal. If the sympathetic branch of the autonomic nervous system is highly aroused, then sweat gland activity also increases, which in turn increases skin conductance. In this way, skin conductance can be a measure of emotional and sympathetic responses. In another example, bioelectrical impedance analysis can be used to determine the electrical impedance, or opposition to the flow of an electric current through body tissues. In yet other examples, blood pressure and heart rate can be measured, which indicates the level of a human body's arousal, wakefulness and/or ability to adjust to one's surroundings.

One of the drawbacks associated with a currently available methods for evaluating the somatic nervous system is the complexity of the devices used. Galvanic skin response systems, for example, require the use of dermal sensors, wires, and a dedicated computer system to gather the information required and formulate a measurement. This can be difficult and tedious for operators of the system to utilize. Another drawback associated with currently available methods is the size and handling of the devices used. Galvanic skin responses systems, for example, are large systems that require shelf space, a power outlet, and a working area. This can be disadvantageous for users that intend to use the system on the go, in the field, or in small or cramped quarters where there is little or no space available.

Therefore, a need exists for improvements over the prior art, and more particularly for more efficient methods and systems for measuring the self-awareness of an individual.

SUMMARY

A method and system for measuring self-awareness of an individual is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a mobile computing device for measuring self-awareness of a user comprises a plurality of motion sensors configured for capturing motion sensor data, a volatile memory, and a processor communicatively coupled with the plurality of motion sensors and the memory. The processor is configured for displaying on the mobile computing device instructions on how to conduct a whipping gesture, wherein a whipping gesture comprises the user whipping his hand about his wrist while said hand is holding the mobile computing device, executing a body awareness assessment comprising: i) receiving first sensor data from the plurality of motion sensors while the user performs multiple whipping gestures; ii) removing noise from the first sensor data; iii) generating a body awareness assessment score based on the first sensor data, executing an emotional awareness assessment comprising: i) instructing the user to hold a defined emotion in mind; ii) receiving second sensor data from the plurality of motion sensors while the user performs multiple whipping gestures; iii) clustering the second sensor data; iv) generating an emotional awareness signal strength based on the clustering of the second sensor data, executing a self-assessment comprising: i) the user making a first selection indicating an emotion the user will hold in mind; ii) receiving third sensor data from the plurality of motion sensors while the user performs multiple whipping gestures; iii) the user making a second selection indicating whether the user feels tension; iv) generating a self-assessment score based on third sensor data and on the user's first and second selection, executing a resiliency awareness assessment comprising: i) instructing the user to execute a breathing exercise and asking the user how he feels after the exercise; ii) receiving a response from the user to the question; iii) generating a resiliency awareness score on the response from the user; and generating a final self-awareness score corresponding to the user's self-awareness based on the body awareness assessment score, emotional awareness signal strength, self-assessment score and resiliency awareness score.

BRIEF DESCRIPTION OF THE DRAWINGS

The accompanying drawings, which are incorporated in and constitute a part of this disclosure, illustrate various example embodiments. In the drawings.

DETAILED DESCRIPTION

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The claimed subject matter improves over the prior art by providing a more efficient, automated, and precise way of measuring self-awareness of an individual. The example embodiments utilize and leverage widely available smart phones or other mobile computing devices to measure self-awareness of an individual. The example embodiments provide a simple and user-friendly method and device which is easy for operators of the system to utilize. The example embodiments also provide a small, handheld system that requires little to no shelf space, and does not require a power outlet or a working area. This is advantageous for users that use the system on the go, in the field or in small or cramped quarters where there is little or no space available. This provides a simple and easily viewable indicator to the user of his or her psychological state.

Figure 1:
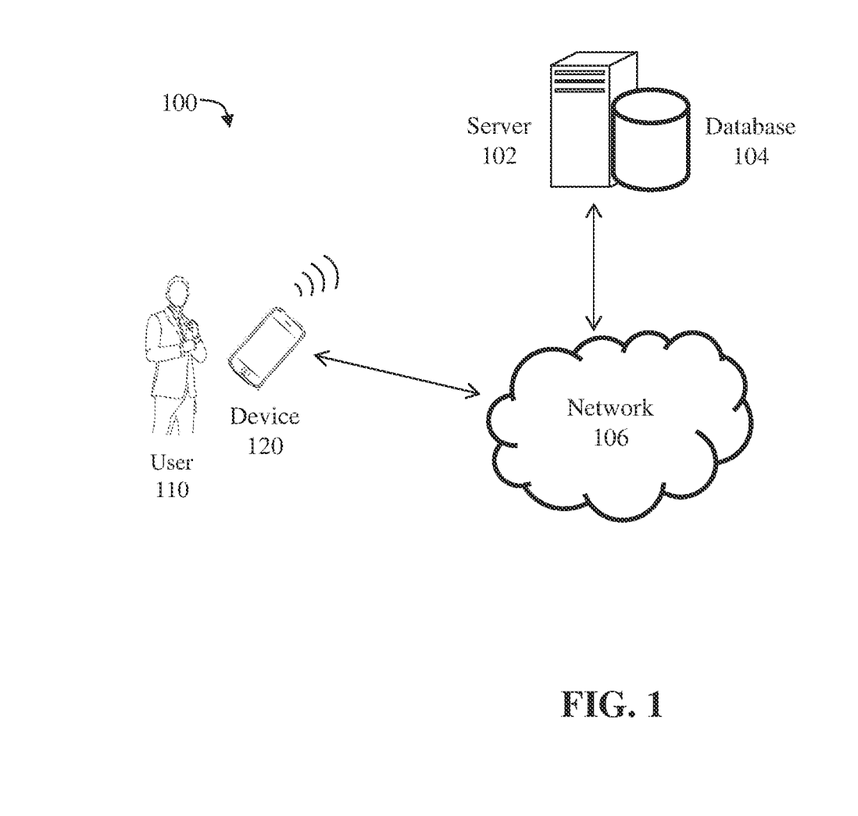
FIG. 1 is a diagram of an operating environment that supports a method and system for measuring self-awareness of an individual, according to an example embodiment.

FIG. 1 is a diagram of an operating environment 100 that supports a method and system for measuring self-awareness of an individual. The server or computing device 102 may be communicatively coupled with a communications network 106, according to an example embodiment. The environment 100 may comprise mobile computing devices 120, which may communicate with computing device (or server) 102 via a communications network 106. Mobile computing device 120 may comprise a cellular/mobile telephone, smart phone, tablet computer, laptop computer, handheld computer, wearable computer, or the like. Device 120 may also comprise other computing devices such as desktop computers, workstations, servers, and game consoles, for example. The mobile computing device 120 may be connected either wirelessly or in a wired or fiber optic form to the communications network 106. Communications network 106 may be a packet switched network, such as the Internet, or any local area network, wide area network, enterprise private network, cellular network, phone network, mobile communications network, or any combination of the above.

The environment 100 shows that mobile computing device 120 is operated by a user 110. Server 102 and device 120 may each comprise a computing device 600, described below in greater detail with respect to FIG. 6. Device 120 may also include one or more motion sensors. Said motion sensors may include an accelerometer, a tilt sensor, a digital compass, a magnetometer, a gyroscope, etc.

Figure 6:
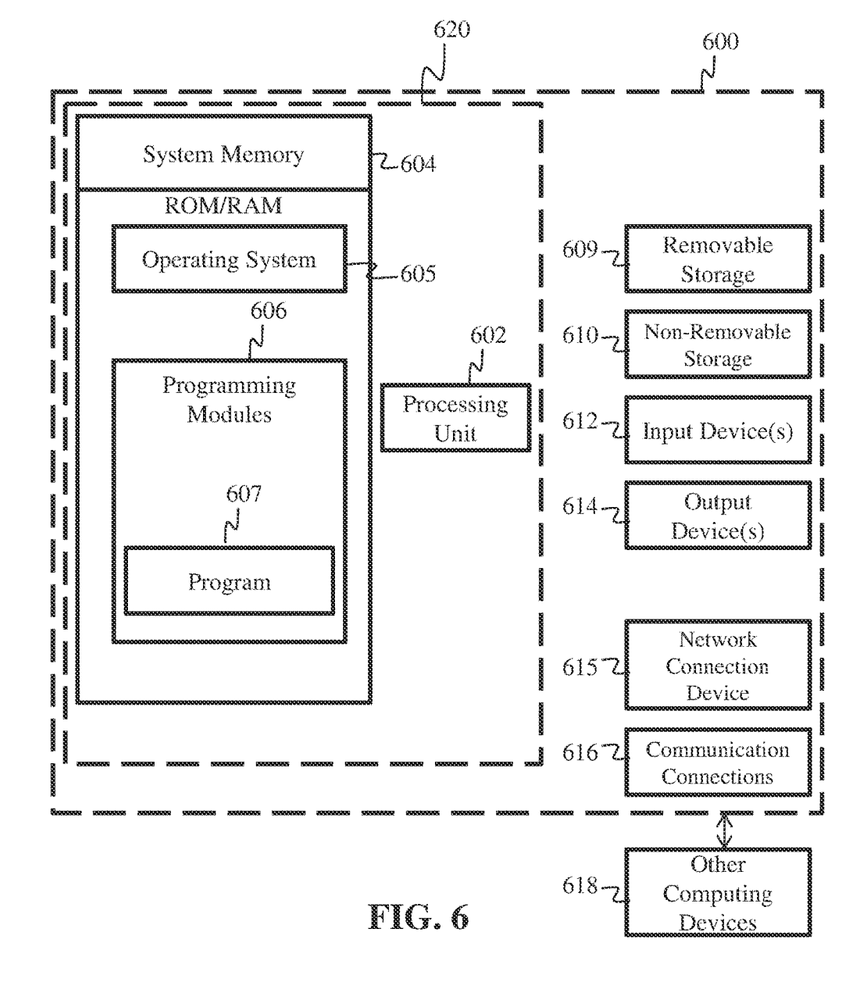
FIG. 6 is a block diagram of a system including a computing device, according to an example embodiment.

Computing device 120 (and/or server 102) may include a software engine that delivers applications, data, program code and other information to networked devices. The software engine of device 120 (or server 102) may perform other processes such as transferring multimedia data in a stream of packets that are interpreted and rendered by a software application as the packets arrive. FIG. 1 further shows that server 102 includes a database or repository 104, which may be a relational database comprising a Structured Query Language (SQL) database stored in a SQL server. Mobile computing device 120 may also include its own database, either locally or via the cloud. The database 104 may serve somatic response data, as well as related information, which may be used by device 102 and mobile computing device 120.

Device 120 and server 102 may each include program logic comprising computer source code, scripting language code or interpreted language code that perform various functions of the disclosed embodiments. In one embodiment, the aforementioned program logic may comprise program module 607 in FIG. 6. It should be noted that although FIG. 1 shows only one mobile computing devices 120 and one server 102, the system of the disclosed embodiments supports any number of servers and mobile computing devices connected via network 106. Also note that although device 120 (and server 102) is shown as a single and independent entity, in one embodiment, device 120 (or server 102) and its functionality can be realized in a centralized fashion in one computer system or in a distributed fashion wherein different elements are spread across several interconnected computer systems.

The database 104 (or a database of device 120) may include a user record for each user 110. A user record may include contact/identifying information for the user (name, address, telephone number(s), email address, etc.), information pertaining to data collected from the user, electronic payment information for the user, etc. A user record may also include a unique identifier for each user, a residential address for each user, the current location of each user (based on location-based services from the user's mobile computer) and a description of past scores and assessments for each user. A user record may further include demographic data for each user, such as age, sex, income data, race, color, marital status, etc.

Database 104 (or a database of device 120) may also be used to store supervised data, as well as unsupervised data for each user. Supervised data refers to input data that has a desired output value. In the case of the instant application, supervised data may comprise motion sensor data that is collected from device 120, wherein the type of the supervised data is known to be either positive or negative. Positive or negative type of supervised data may refer to the state of mind of the user during the triple whip gesture. Positive type of supervised data may refer to instances when the user is affirming a statement, making a statement of affirmation, making a statement that is true, making a verbal statement of affirmation, making a verbal statement that is true, holding a positive thought in mind, embodying a positive emotion, doing a breath exercise to relax the body, holding a food with which the user has a positive sensitivity, or looking at a food with which the user has a positive sensitivity. Negative type of supervised data may refer to instances where the user is negating a statement, making a statement of negation, making a statement that is false, making a verbal statement of negation, making a verbal statement that is false, holding a negative thought in mind, embodying a negative emotion, doing a breath exercise to tense the body, holding a food with which the user has a negative sensitivity, or looking at a food with which the user has a negative sensitivity. Thus, supervised data may refer to captured motion sensor data wherein the type of the data is known beforehand or is a given.

Unsupervised data refers to input data that has no desired output value. In the case of the instant application, unsupervised data may comprise motion sensor data that is collected from device 120, wherein the type of the supervised is not known to be either positive or negative at the time the data is captured. Thus, unsupervised data may refer to captured motion sensor data wherein the type of the data is calculated by the system at a later time.

Database 104 (or a database of device 120) may also be used to store motion data received from the sensors for each user while doing a gesture, such as a whipping gesture. Database 104 (or a database of device 120) may also be used to store the following data for each user: body awareness assessment score, emotional awareness signal strength, self-assessment score, resiliency awareness score, labels, final self-awareness scores and any selections made by the user on his or her device 120.

In one embodiment, all of the data collected or calculated by device 120 may be transmitted to server 102 via network 106. In another embodiment, data (such as supervised or unsupervised data) may be collected by device 120 and transmitted to server 102 via network 106, wherein server 102 subsequently performs calculations using said data, as described more fully below.

Figure 2:
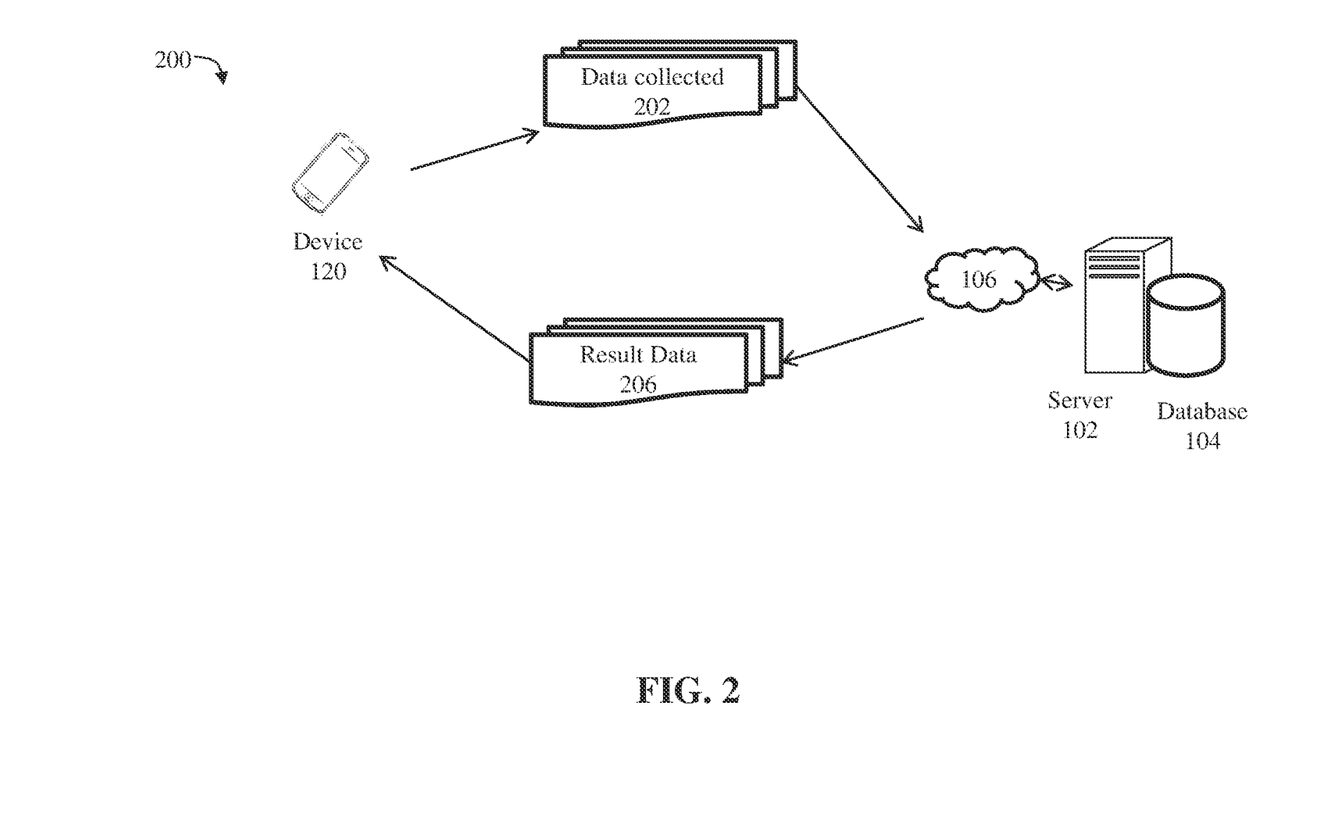
FIG. 2 is a diagram showing the data flow of the general process for measuring self-awareness of an individual, according to an example embodiment.
Figure 3:
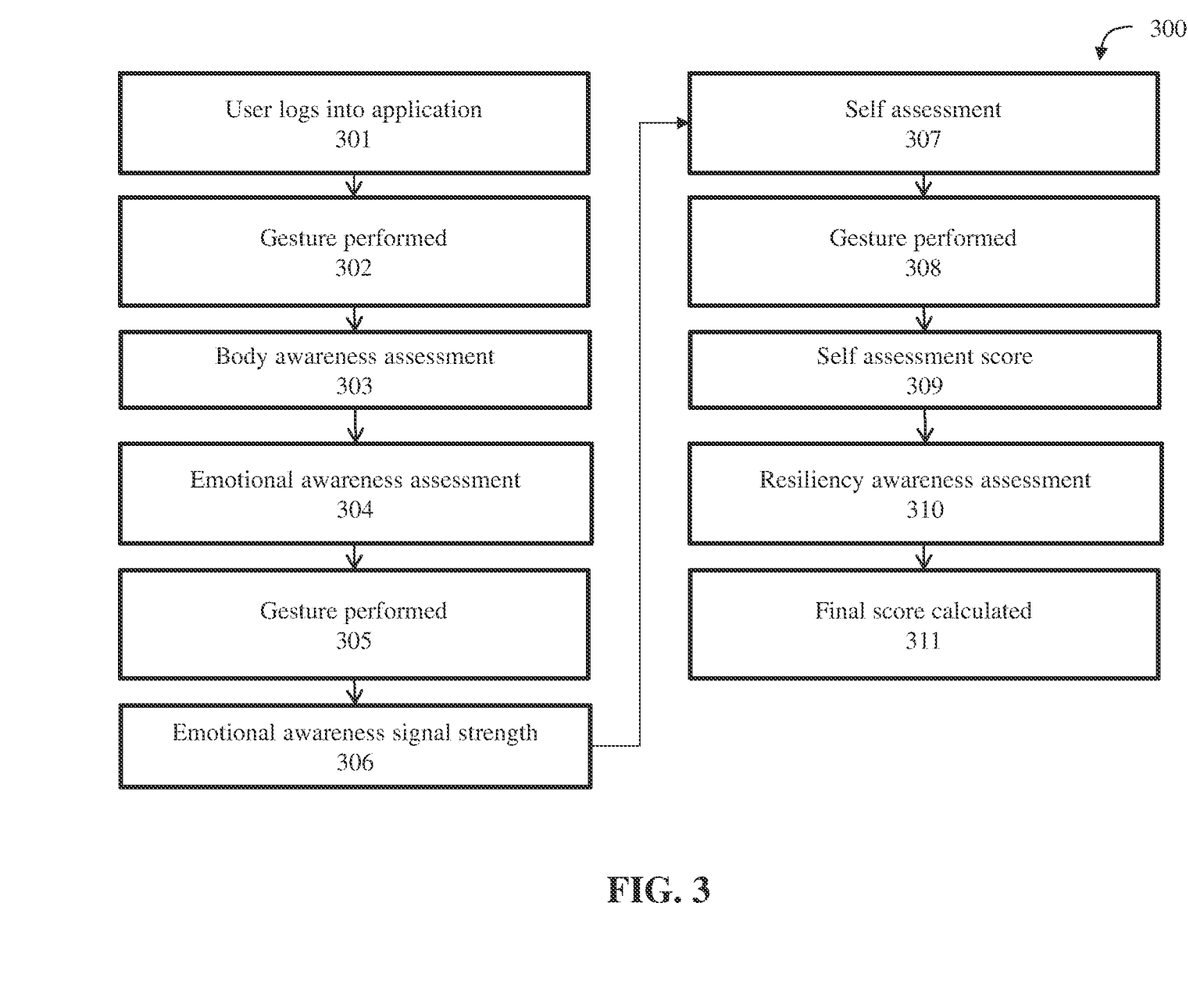
FIG. 3 is a flow chart showing the control flow of the process for measuring self-awareness of an individual, according to an example embodiment.

FIG. 3 is a flow chart showing the control flow of the process for measuring self-awareness of an individual, according to an example embodiment. Process 300 describes the steps that begin to occur when the user 110 utilizes device 120 to measure self-awareness. The process 300 is described with reference to FIG. 2, which shows the general data flow 200 of the process 300, as well as FIGS. 4 and 5. The actions described in the steps of flowchart 300 may be performed by the device 120, the server 102 or any combination of the two.

Prior to the beginning of the process 300, stored in database 104 (or in a database of device 120) may be a user record that holds data about the user 110, such as name, address, email address, unique identifier, handle, telephone number, age, sex, occupation, marital status, etc. Process 300 starts in earnest with step 301 wherein user 110 logs in to an application, such as a mobile application, on device 120. It should be noted that although the process 300 is described in terms of actions executed by processor 602 (see FIG. 6) on device 120, in one embodiment, any such actions ascribed to processor 602 on device 120 may be performed by a processor on server 102.

In step 301, the processor 602 on device 120 displays on the mobile computing device 120 instructions on how to conduct the whipping gesture, which is described in more detail below with reference to FIG. 5. In one embodiment, the processor 602 on device 120 displays on the mobile computing device 120 instructions on how to conduct the whipping gesture three times, i.e., the triple whip gesture.

In step 302, the user 110 performs the gesture instructed in step 301, which may be a triple whip gesture.

In step 303, the processor 602 on device 120 executes a body awareness assessment comprising: i) receiving first sensor data from the plurality of motion sensors while the user performs the gesture of step 302; ii) removing noise from the first sensor data; and iii) generating a body awareness assessment score based on the first sensor data. The step of removing noise includes using an algorithm that applies a smoothing function in order to remove noise. A smoothing function creates an approximating function that attempts to capture important patterns in the first sensor data, while leaving out noise or other phenomena. Using the smoothing function, the data points of a signal are modified so individual points higher than the adjacent points (presumably because of noise) are reduced, and points that are lower than the adjacent points are increased leading to a smoother signal. An example of noise that may be removed in this step is jitteriness of the user that might appear as a false peak or a mini peak. The step of generating a body awareness assessment score based on the first sensor data may include starting with a set number and deducting a point each time the user gets the gesture of step 302 wrong. A wrong gesture would be any gesture that has more or less than three peaks of data, if the triple whip gesture is instructed in step 301 (or two peaks of data, if a double whip gesture is instructed in step 301, etc.). The body awareness assessment score may be displayed in the display of device 120.

A body awareness assessment may comprise the user executing three positive and three negative gestures (such as the triple whip gesture) for a combined six gestures in total. During each individual gesture executed by the user, the user is measured on body awareness for the resulting emotional awareness score. That is, the user's body awareness affects the resulting emotional awareness score. For each gesture, the user may whip the phone three times, and if the user whips the phone more or less than three times, the user loses body awareness points.

In step 304, the processor 602 on device 120 executes an emotional awareness assessment by instructing the user to hold a defined emotion in mind and the processor 602 on device 120 displays on the mobile computing device 120 instructions on how to conduct the whipping gesture, which is described in more detail below with reference to FIG. 5. In one embodiment, the processor 602 on device 120 displays on the mobile computing device 120 instructions on how to conduct the whipping gesture three times, i.e., the triple whip gesture.

In step 305, the user 110 performs the gesture instructed in step 304.

In step 306, the processor 602 on device 120 receives second sensor data from the plurality of motion sensors while the user performs the gestures of step 305. Also, in this step, the processor 602 on device 120 performs a clustering algorithm on the second sensor data. The second sensor data are clustered based on one or more features of the gesture embodied in the second sensor data.

k-means clustering is a well-known method of vector quantization that aims to partition multiple observations into k clusters in which each observation belongs to the cluster with the nearest mean. k-means clustering is used to cluster sensor data into one of multiple clusters (such as a positive type cluster and a negative type cluster), according to various aspects, metadata, or attributes of the sensor data, such as the time of completion of the triple whip gesture, the strength of the movement, the speed of the movement, the magnitude of the accelerations involved, the magnitude of the speeds involved, the range of speeds involved, the range of accelerations, and the like. In step 306, the first and second sensor data may be clustered according to a k-means clustering algorithm.

In one embodiment, the k-means clustering algorithm is a heuristic-based algorithm that takes in all of the motion data generated during both the negative and positive emotional calibrations. Next, the clustering algorithm looks at the features of the motion data, which includes but is not limited to pitch, roll, yaw, frequency, amplitude, spatial alignment, and shape (referred to as "features" herein) of the individual radians that are generated by the motion sensors of the mobile computing device. Based on these features, the clustering algorithm clusters the motion data into two distinct groups of similar features. After successfully clustering the motion data into groups one and group two, the algorithm looks back to see if all of the motion data in group one came from the "positive state" and if all of the data in group two came from the "negative" state. The distribution of the clusters informs the emotional awareness score.

Also in step 306, the processor 602 on device 120 generates an emotional awareness signal strength based on the clustering of the second sensor data. In this step, the processor 602 evaluates the data clustered using the clustering algorithm and determines how well-defined the clusters appear. If clusters are well-defined, then there are few, if any, outliers, the cluster areas are small, and there is no overlap between the areas defined by clusters. If clusters are not well-defined, then there may be one or more outliers, the cluster areas may be large, and there may be overlap between the areas of clusters. According to how well-defined the areas of the clusters appear, the processor 602 calculates signal strength, which may be displayed by device 120 using a graphic, text, audio, or video. Signal strength may be numerical value, such as a continuous range of real number values between 1 and 100 or between 0 and 1. The calculated signal strength is based on how tightly coupled the clusters are in the clustering steps above. There may be a total of six gestures across the two classifications, and the calculated signal strength may be calculated by identifying the two nearest neighboring gestures to each gesture and identifying if the classifications match. This may be repeated for each one of the gestures. The emotional awareness signal strength may be displayed in the display of device 120.

In step 307, the processor 602 on device 120 executes a self-assessment comprising the user making a first selection in the display of device 120 indicating an emotion the user will hold in mind and the processor 602 on device 120 displays on the mobile computing device 120 instructions on how to conduct the whipping gesture, which is described in more detail below with reference to FIG. 5. In one embodiment, the processor 602 on device 120 displays on the mobile computing device 120 instructions on how to conduct the whipping gesture three times, i.e., the triple whip gesture.

In step 308, the user 110 performs the gesture instructed in step 307.

In step 309, the processor 602 on device 120 receives third sensor data from the plurality of motion sensors while the user performs the gestures of step 308 and the user making a second selection in the display of device 120 indicating whether the user feels tension. Also in this step, the processor 602 on device 120 generates a self-assessment score based on third sensor data and on the user's first and second selection. Self-assessment is scored by the user assessing if they have tension or no tension related to the specific feeling/emotional state they identify as their current emotional state. The score is based upon the congruency of the response. The self-assessment score may be displayed in the display of device 120.

In step 310, the processor 602 on device 120 executes a resiliency awareness assessment comprising: i) instructing the user, via the display of device 120, to execute a breathing exercise and asking the user how he or she feels after the exercise; ii) receiving a response from the user, via the display of device 120, to the question by the user making a selection in the display of device 120; iii) and generating a resiliency awareness score on the response from the user. The user is provided a breathing technique, two times, that utilizes a breathing pattern that has been scientifically demonstrated to activate the parasympathetic nervous system which is responsible for helping a human feel relaxed. After completing the breathing technique, the user is prompted with a question, such as, "Do you feel more relaxed?" In response, the user can answer yes or no. If they say "no" they lose a point, otherwise, they retain a set number of points. The resiliency awareness score may be displayed in the display of device 120.

In step 311, the processor 602 on device 120 generates a final self-awareness score corresponding to the user's self-awareness based on the body awareness assessment score, emotional awareness signal strength, self-assessment score and resiliency awareness score. There is a mapping algorithm that identifies each one of the component elements (i.e., body, resilience, emotional awareness, etc.), based upon reaching or not reaching a specific threshold. The different combinatory classifications are mapped to a specific self-awareness level thereby providing a score of an individual's level of momentary awareness. Said mapping algorithm maps said component elements to a final self-awareness score. The final score or a graphic representing the final score may be displayed in the display of device 120.

In one alternative to step 311, the processor 602 on device 120 generates a label corresponding to the user's self-awareness based on the body awareness assessment score, emotional awareness signal strength, self-assessment score and resiliency awareness score. A label is defined as the name attributed to one of a variety of emotions, such as happiness, sadness, embarrassment, fright, love, anxiety, disgust, satisfaction, ashamed, comfort, etc. There is a mapping algorithm that identifies each one of the component elements (i.e., body, resilience, emotional awareness, etc.) based upon reaching or not reaching a specific threshold. The different combinatory classifications are mapped to the specific level, thereby providing a score of an individual's psychological state, or level of momentary awareness. The label or a graphic representing the label may be displayed in the display of device 120.

Figure 4:
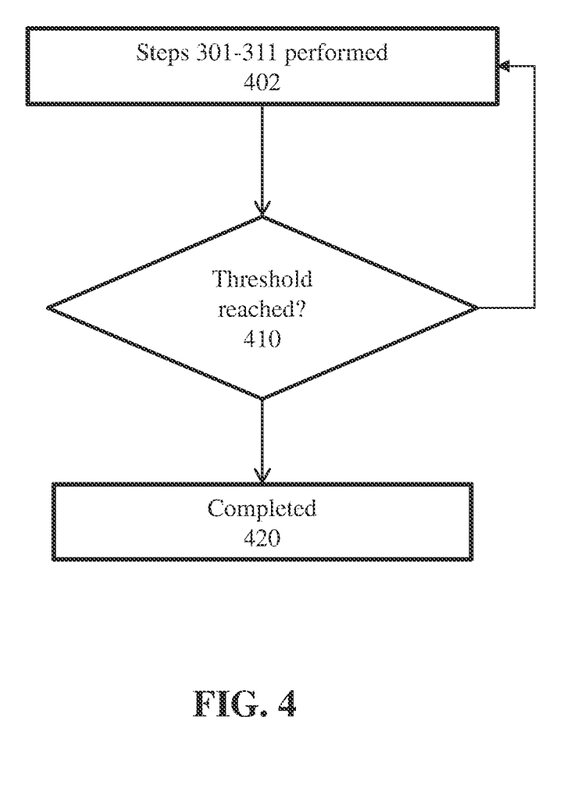
FIG. 4 is a flow chart showing the control flow of an alternative process for measuring self-awareness of an individual, according to an example embodiment.

FIG. 4 is a flow chart showing the control flow of an alternative process for measuring self-awareness of an individual, according to an example embodiment. Step 402 is identical to steps 301-311 above. But in step 410, the processor 602 inquires whether a predefined threshold signal strength has been reached. If so, then in step 420, the calibration process is completed. If not, then control flows back to step 402 above, and the process repeats itself until the predefined threshold signal strength has been reached in step 410.

Figure 5:
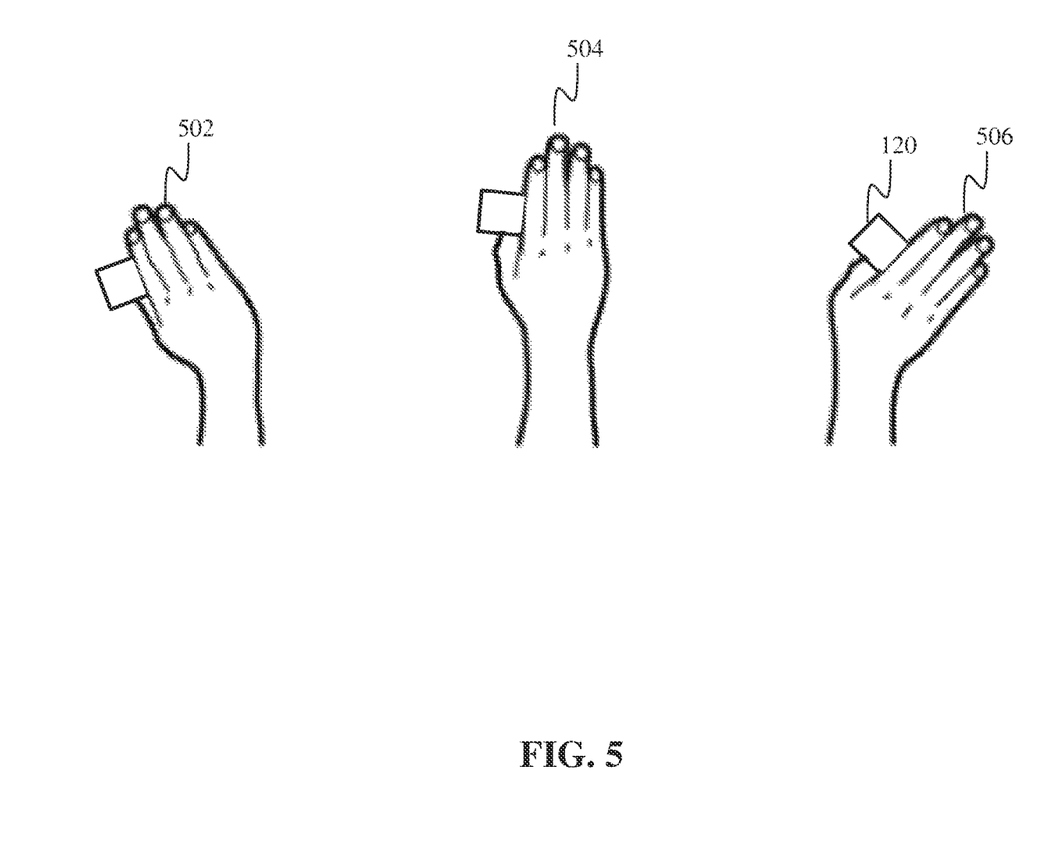
FIG. 5 is an illustration showing a whipping gesture, according to an example embodiment.

FIG. 5 is an illustration showing the hand gesture made by the user, according to an example embodiment. FIG. 5 shows that a whip gesture may comprise holding the device 120 in the user's hand and starting the movement in step 502, wherein the user's hand may move about wrist, such that the hand is deviated toward the left. Next, the user performs a whipping movement that moves the device 120 such that the hand moves about the wrist towards the right, wherein step 504 shows that the user's wrist has moved such that the hand is aligned with the arm and there is no deviation of the hand compared to the arm. Lastly, in step 506, the whipping movement continues to move the device 120 such that the hand moves about the wrist and deviates towards the right. The steps 502-506 show one whipping gesture. A triple whipping gesture may comprise performing this whipping gesture three times.

FIG. 6 is a block diagram of a system including an example computing device 600 and other computing devices. Consistent with the embodiments described herein, the aforementioned actions performed by device 120 or server 102 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and process 300, as described above. Process 300 may operate in other environments and are not limited to computing device 600.

With reference to FIG. 6, a system consistent with an embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g., random access memory (RAM)), non-volatile (e.g., read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of device 120 or server 102. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable, and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter, or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g., program module 607) may perform processes including, for example, one or more of the stages of the process 300 as described above. The aforementioned processes are examples, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged, or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile computing device for measuring self-awareness of a user, the mobile computing device comprising:
   a) a plurality of motion sensors configured for capturing motion sensor data;
   b) a volatile memory; and
   c) a processor communicatively coupled with the plurality of motion sensors and the memory, the processor configured for:
      1) displaying on the mobile computing device instructions on how to conduct a whipping gesture, wherein a whipping gesture comprises the user whipping his hand about his wrist while said hand is holding the mobile computing device;
      2) executing a body awareness assessment comprising: i) receiving first sensor data from the plurality of motion sensors while the user performs multiple whipping gestures; ii) removing noise from the first sensor data; iii) generating a body awareness assessment score based on the first sensor data;
      3) executing an emotional awareness assessment comprising: i) instructing the user to hold a defined emotion in mind; ii) receiving second sensor data from the plurality of motion sensors while the user performs multiple whipping gestures; iii) clustering the second sensor data; iv) generating an emotional awareness signal strength based on the clustering of the second sensor data;
      4) executing a self-assessment comprising: i) the user making a first selection indicating an emotion the user will hold in mind; ii) receiving third sensor data from the plurality of motion sensors while the user performs multiple whipping gestures; iii) the user making a second selection indicating whether the user feels tension; iv) generating a self-assessment score based on third sensor data and on the user's first and second selection;
      5) executing a resiliency awareness assessment comprising: i) instructing the user to execute a breathing exercise and asking the user how he feels after the exercise; ii) receiving a response from the user to the question; iii) generating a resiliency awareness score on the response from the user; and
      6) generating a final self-awareness score corresponding to the user's self-awareness based on the body awareness assessment score, emotional awareness signal strength, self-assessment score and resiliency awareness score.

2. The mobile computing device of claim 1, further comprising:
   a display for displaying user instructions for executing the multiple whipping gestures.

3. The mobile computing device of claim 2, wherein the display is further configured for prompting the user to hold a defined emotion in mind when the user is providing said second sensor data.

4. The mobile computing device of claim 3, wherein the display is further configured for displaying a graphical user interface that allows the user to select an emotion when providing said third sensor data, and for making the second selection.

5. The mobile computing device of claim 4, wherein the display is further configured for displaying user instructions for executing the breathing exercise.

6. The mobile computing device of claim 5, wherein the plurality of motion sensors comprises at least one accelerometer.

7. The mobile computing device of claim 6, wherein the plurality of motion sensors comprises at least one accelerometer, at least one gyroscope and at least one magnetometer.

8. The mobile computing device of claim 7, wherein the display is further configured for displaying a graphic representing the final self-awareness score that was calculated.

9. The mobile computing device of claim 1, wherein the plurality of motion sensors comprises at least one accelerometer.

10. The mobile computing device of claim 1, wherein the plurality of motion sensors comprises at least one accelerometer, at least one gyroscope and at least one magnetometer.

11. A method for measuring self-awareness of a user, the method comprising:
   providing a mobile computing device including a plurality of motion sensors configured for capturing motion sensor data, a volatile memory, and a processor communicatively coupled with the plurality of motion sensors and the memory;
   displaying by the processor, on the mobile computing device, instructions on how to conduct a whipping gesture, wherein a whipping gesture comprises the user whipping his hand about his wrist while said hand is holding the mobile computing device;
   executing, by the processor, a body awareness assessment comprising: i) receiving first sensor data from the plurality of motion sensors while the user performs multiple whipping gestures; ii) removing noise from the first sensor data; iii) generating a body awareness assessment score based on the first sensor data;
   executing, by the processor, an emotional awareness assessment comprising: i) instructing the user to hold a defined emotion in mind; ii) receiving second sensor data from the plurality of motion sensors while the user performs multiple whipping gestures; iii) clustering the second sensor data; iv) generating an emotional awareness signal strength based on the clustering of the second sensor data;

executing, by the processor, a self-assessment comprising: i) the user making a first selection indicating an emotion the user will hold in mind; ii) receiving third sensor data from the plurality of motion sensors while the user performs multiple whipping gestures; iii) the user making a second selection indicating whether the user feels tension; iv) generating a self-assessment score based on third sensor data and on the user's first and second selection;

executing, by the processor, a resiliency awareness assessment comprising: i) instructing the user to execute a breathing exercise and asking the user how he feels after the exercise; ii) receiving a response from the user to the question; iii) generating a resiliency awareness score on the response from the user; and generating, by the processor, a final self-awareness score corresponding to the user's self-awareness based on the body awareness assessment score, emotional awareness signal strength, self-assessment score and resiliency awareness score.

12. The method of claim 11, further comprising:
displaying, by the processor, on a display of the mobile computing device, user instructions for executing the multiple whipping gestures.

13. The method of claim 12, further comprising:
prompting, by the processor, on the display of the mobile computing device, the user to hold a defined emotion in mind when the user is providing said second sensor data.

14. The method of claim 13, further comprising:
displaying, by the processor, on the display of the mobile computing device, a graphical user interface that allows the user to select an emotion when providing said third sensor data, and for making the second selection.

15. The method of claim 14, further comprising:
displaying, by the processor, on the display of the mobile computing device, user instructions for executing the breathing exercise.

16. The method of claim 15, wherein the plurality of motion sensors comprises at least one accelerometer.

17. The method of claim 16, wherein the plurality of motion sensors comprises at least one accelerometer, at least one gyroscope and at least one magnetometer.

18. The method of claim 17, further comprising:
displaying, by the processor, on the display of the mobile computing device, a graphic representing the final self-awareness score that was calculated.

19. The method of claim 11, wherein the plurality of motion sensors comprises at least one accelerometer.

20. The method of claim 11, wherein the plurality of motion sensors comprises at least one accelerometer, at least one gyroscope and at least one magnetometer.

* * * * *